(12) United States Patent
Iseki

(10) Patent No.: US 8,928,963 B2
(45) Date of Patent: Jan. 6, 2015

(54) LIGHT SCANNING DEVICE AND DISPLAY APPARATUS

(71) Applicant: JVC Kenwood Corporation, Yokohama-shi (JP)

(72) Inventor: Takayuki Iseki, Yokohama (JP)

(73) Assignee: JVC Kenwood Corporation (JP)

( * ) Notice: Subject to any disclaimer, the term of this patent is extended or adjusted under 35 U.S.C. 154(b) by 0 days.

(21) Appl. No.: 14/036,328

(22) Filed: Sep. 25, 2013

(65) Prior Publication Data
US 2014/0104840 A1    Apr. 17, 2014

(30) Foreign Application Priority Data
Oct. 12, 2012    (JP) .................................. 2012-226883

(51) Int. Cl.
*G02B 26/08* (2006.01)
*G02B 26/10* (2006.01)

(52) U.S. Cl.
CPC ........................................ *G02B 26/10* (2013.01)
USPC .................. 359/221.2; 359/198.1; 359/199.1; 359/224.1

(58) Field of Classification Search
CPC .. G02B 26/0841; G02B 26/10; G02B 7/1821; G02B 26/0833; G02B 26/105; G02B 26/085
USPC .......... 359/199.1–199.4, 200.6–200.8, 221.2, 359/224.1–224.2
See application file for complete search history.

(56) References Cited

U.S. PATENT DOCUMENTS
2010/0296147 A1 * 11/2010 Terada et al. .............. 359/224.1

FOREIGN PATENT DOCUMENTS
JP    2000214407    8/2000

* cited by examiner

*Primary Examiner* — James Phan
(74) *Attorney, Agent, or Firm* — Cantor Colburn LLP

(57) ABSTRACT

Provided is a light-scanning device may be designed to have a high resonance frequency and a large scanning angle. A mirror unit vibrates by using an arbitrary straight line as a rotation axis. A pair of first beam portions are disposed on a straight line that is parallel to the rotation axis, and support the mirror unit. A pair of second beam portions are disposed so as to be line-symmetrical to the pair of the first beam portions about the rotation axis as an axis of symmetry, and support the mirror unit. A pair of first arm portions respectively support the pair of first beam portions. A pair of second arm portions respectively support the pair of second beam portions. A pair of third beam portions support the mirror unit between the first beam portions and the second beam portions.

9 Claims, 15 Drawing Sheets

LIGHT SCANNING DEVICE AND DISPLAY APPARATUS

CROSS-REFERENCE TO RELATED PATENT APPLICATIONS

This application claims the benefit of Japanese Patent Application No. 2012-226883, filed on Oct. 12, 2012, in the Japan Patent Office, the disclosure of which is incorporated herein in its entirety by reference.

BACKGROUND OF THE INVENTION

1. Field of the Invention

The present invention relates to a light-scanning device that scans an object by a light beam, and a display apparatus.

2. Description of the Related Art

Light-scanning devices that scan an object by reflecting light are used in projection type display apparatuses such as a laser projector, a head mount display or a head-up display, laser printers, bar-code readers, and the like. Light-scanning devices using a polygon mirror, a galvano mirror, or the like are known. However, a subminiature light-scanning device (microscanner) that is manufactured of a silicon (Si) wafer by a micro electro mechanical system (MEMS) technique has recently attracted much attention. In such a light-scanning device, torsion springs (torsion beams) is used as a pair of beam portions that support both ends of a mirror unit, and thus the mirror unit vibrates. The light-scanning device is driven at a high speed with a resonance frequency regarding mechanical strength, thereby attaining a necessary scanning angle using a low driving force.

When the light-scanning device is applied to a display apparatus, the light-scanning device is required to be driven with a higher resonance frequency and at a larger scanning angle in order to obtain a high resolution. A spring constant of a torsion spring is required to be increased in order to design the light-scanning device with a higher resonance frequency, but at the same time a material limit of a spring stress is decreased. Thus, in a brittle material such as silicon, a torsion spring is destroyed (or fractured) at a smaller scanning angle. That is, the resonance frequency and the scanning angle have a trade-off relationship, and it is difficult to realize a high-resolution display apparatus such as XGA, SXGA, or HDTV formats, using the previous light-scanning devices.

The inventors of the present invention have suggested a light-scanning device in which two beam portions support both ends of a mirror unit and four arm portions support four beam portions in order to increase the spring constant without increasing the stress subjected to the torsion spring (Patent Document 1). According to the research of the inventors, in such a light-scanning device, a resonance frequency of 38 kHz and a scanning angle of 55° or more are realized in a mirror width of 1 mm. This result may not be obtained in a structure of the related art, and allows the XGA and SXGA resolutions to be realized.

It has been reported that a scanning angle of about 90° is required when a mirror width is 1 mm and a resonance frequency is 36 kHz in order to realize HDTV resolution.

However, even if the light-scanning device disclosed in Patent Document 1 is used, there is a concern that a beam portion may exceed a limiting stress to thereby be destroyed when driving at the scanning angle of 90° required for HDTV resolution or a scanning angle may be insufficient.

(Patent Document 1) Japanese Laid-Open Patent Publication No. 2000-214407

SUMMARY OF THE INVENTION

The present invention provides a light-scanning device which may be designed to have a high resonance frequency and a large scanning angle, and a display apparatus.

According to one aspect of the present invention, there is provided a light-scanning device including a mirror unit 11 which vibrates using an arbitrary straight line as a rotation axis, a pair of first beam portions 12a and 12b which are respectively disposed on a straight line that is parallel to the rotation axis, and support the mirror unit 11; a pair of second beam portions 12c and 12d which are respectively disposed so as to be line-symmetrical to the pair of the first beam portions 12a and 12b about the rotation axis as an axis of symmetry, and support the mirror unit 11; a pair of first arm portions which respectively support the pair of the first beam portions 12a and 12b; a pair of second arm portions which respectively support the pair of second beam portions 12c and 12d; a pair of third beam portions 14a and 14b which support the mirror unit 11 between the first beam portions 12a and 12b and the second beam portions 12c and 12d; a pair of third arm portions 15a and 15b which respectively support the pair of third beam portions 14a and 14b; and a frame portion which supports the first arm portions, the second arm portions, and the third arm portions 15a and 15b.

According to another aspect of the present invention, there is provided a display apparatus including the light-scanning device according to the one aspect, a light source unit 55 which emits a laser beam to the mirror unit 11, and a control unit 50 which controls the driving of the light-scanning device 1 and the light source unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
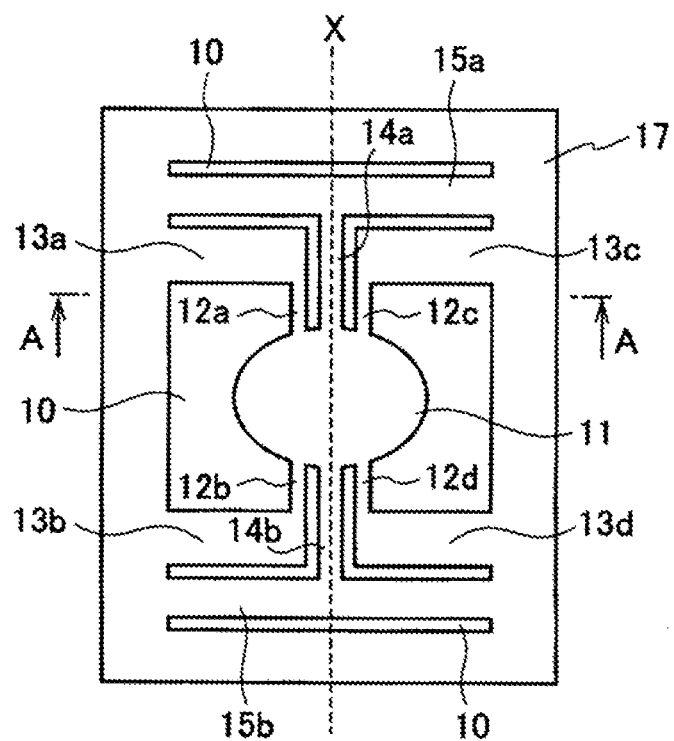
FIG. 1A is a schematic plan view illustrating a light-scanning device according to a first embodiment of the present invention.

Hereinafter, first to fifth embodiments of the present invention will be described with reference to the accompanying drawings. In the description of the drawings, the same or similar parts are denoted by the same or similar reference numerals, and their repeated description will be omitted. Incidentally, the drawings are schematically shown, and the relationship between a thickness and a plane dimension and a ratio of the thickness of each layer are different from a real magnitude. Therefore, detailed thickness and dimension should be determined considering the description below. In each of the drawings, the dimensional relationship and the ratio between parts may be different.

The first to fourth embodiments below are described as examples of a device and a method for embodying the technical concept of the present invention. Accordingly, the present invention is not limited to the material quality, the shape, structure, and arrangement of components described below and may be variously changed within the spirit and scope of the invention as defined by the appended claims:

First Embodiment

A light-scanning device according to a first embodiment of the present invention includes a mirror unit 11, beam portions 12a, 12b, 12c, 12d, 14a, and 14b, arm portions 13a, 13b, 13c, 13d, 15a, and 15b, and a frame portion 17, as illustrated in FIG. 1A. The mirror unit 11 has a mirror that reflects light. The mirror of the mirror unit 11 is formed by forming a metal thin film having a high reflexibility, such as aluminum (Al) or gold (Au), on a top surface thereof. The mirror unit 11 scans an object by reflecting a light beam while vibrating (shaking), by using an arbitrary straight line (for example, a straight line passing through a center portion of the mirror unit 11) as a rotation axis X.

The beam portions 12a to 12d have, for example, a bar shape, and extend in a direction parallel to the rotation axis X. The beam portions 12a and 12b (first beam portions) support the mirror unit 11 by respectively connecting the both ends of the mirror unit 11 to one ends of the beam portion 12a and 12b so that straight line connected to each other are separated from and are parallel to the rotation axis X. The beam portions 12c and 12d (second beam portions) support the mirror unit 11 by respectively connecting the both ends of the mirror unit 11 to one ends of the beam portion 12c and 12d so that the beam portions 12c and 12d are line-symmetrical to the beam portions 12a and 12b about the rotation axis X as an axis of symmetry.

The arm portions 13a to 13d have, for example, a band shape, and extend in a direction perpendicular to the beam portions 12a to 12d, respectively. The arm portions 13a and 13b (first arm portions) support the beam portions 12a and 12b by respectively connecting the other ends of the beam portions 12a and 12b to one ends of arm portions 13a and 13b. The arm portions 13c and 13d (second arm portions) support the beam portions 12c and 12d by respectively connecting the other ends of the beam portions 12c and 12d to one ends of the arm portions 13c and 13d so that the arm portions 13c and 13d are line-symmetrical to the arm portions 13a and 13b about the rotation axis X as an axis of symmetry.

The beam portions 14a and 14b (third beam portions) have, for example, a bar shape, and extend in a direction parallel to the rotation axis X. The beam portions 14a and 14b support the mirror unit 11 between the beam portions 12a and 12b and the beam portions 12c and 12d by respectively connecting the both ends of the mirror unit 11 to one ends of the beam portions 14a and 14b.

The arm portions 15a and 15b (third arm portions) have, for example, a band shape, and extend in a direction perpendicular to the beam portions 14a and 14b. The arm portions 15a and 15b support the beam portions 14a and 14b by respectively connecting the other ends of the beam portions 14a and 14b to center portions (on the same straight line as the rotation axis) of the arm portions 15a and 15b.

The frame portion 17 has a frame shape that has a rectangular window portion 10 penetrating from the top surface to the bottom thereof. The mirror unit 11, the beam portions 12a to 12d, 14a, and 14b, and the arm portions 13a to 13d, 15a, and 15b are located in the window portion 10 of the frame portion 17. The frame portion 17 supports the arm portions 13a to 13d by respectively connecting the other ends of the arm portions 13a to 13d to the frame portion 17. The frame portion 17 supports the arm portions 15a and 15b by respectively connecting both ends of the arm portions 15a and 15b to the frame portion 17.

The light-scanning device according to the first embodiment has a schematic rectangular flat plate shape. The light-scanning device has topology of two rotational symmetry that uses a perpendicular line with respect to the mirror unit 11 which passes through the center of the mirror unit 11, as a point of symmetry.

The mirror unit 11, the beam portions 12a to 12d, 14a, and 14b, and the arm portions 13a to 13d, 15a, and 15b, and the frame portion 17 may be formed of the same SOI (silicon on insulator) substrate in which an insulating layer constituted by a silicon oxide layer ($SiO_2$) and a single crystal Si layer are sequentially stacked on a supporting substrate constituted by silicon (Si), using MEMS technology.

Figure 1B:
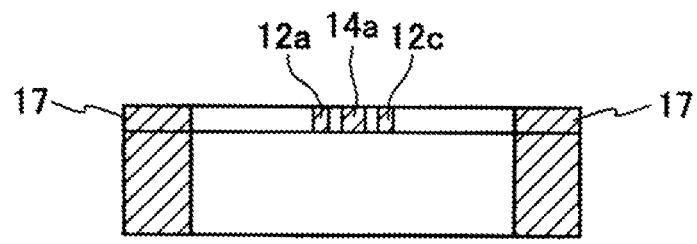
FIG. 1B is a cross-sectional view seen from a direction A-A of FIG. 1A.

As illustrated in FIG. 1B, the mirror unit 11, the beam portions 12a to 12d, 14a, and 14b, and the arm portions 13a to 13d, 15a, and 15b have a thickness of, for example, 40 to 60 μm, and are formed to have a thickness smaller than that of the frame portion 17. The frame portion 17 has a thickness of, for example, 400 to 500 μm. When the light-scanning device is formed of an SOI substrate, the mirror unit 11, the beam portions 12a to 12d, 14a, and 14b, and the arm portions 13a to 13d, 15a, and 15b may be formed from an Si layer of the upper portion of the SOI substrate. SOI substrate which has a desired thickness of Si layer, the insulating layer and supporting substrate, are employed according to the design of the mirror unit 11, the beam portions 12a to 12d, 14a, and 14b, the arm portions 13a to 13d, 15a, and 15b, and the frame portion 17.

When any one of the arm portions 13a and 13b, the arm portions 13c and 13d, and the arm portions 15a and 15b is driven, the mirror unit 11 vibrates by using the straight line passing through the center portion thereof as the rotation axis X. As a method of driving the light-scanning device, a piezoelectric driving method using a piezoelectric effect of a piezoelectric body, an electromagnetic driving method such as a moving coil (MC) method or a moving magnet (MM) method using Lorentz force between a coil and a magnet, an electrostatic driving method using electrostatic force between electrodes, or the like may be employed.

A resonance frequency regarding mechanical strength when the mirror unit 11 vibrates is increased in accordance with a spring constant of the total of the beam portions 12a to 12d and the beam portions 14a and 14b. The light-scanning device according to the first embodiment includes a plurality of pairs of the beam portions 12a to 12d, 14a, and 14b, and thus, when deformation due to a constant scanning angle is generated, stress applied to each of the beam portions 12a to 12d, 14a, and 14b be dispersed and reduced.

According to the light-scanning device of the first embodiment, when the mirror unit 11 is vibrated so as to have the same scanning angle, stress applied to each beam portion is low, and thus a beam portion is difficult to be destroyed, as compared with a configuration in which the mirror unit 11 is supported by a pair of beam portions. Therefore, the light-scanning device according to the first embodiment may be designed to have a high resonance frequency and a large scanning angle, as compared with a structure of the related art.

In addition, in the light-scanning device according to the first embodiment, a resonance frequency and a spring constant increases, and stress applied to the beam portions 12a to 12d become substantially identical at the same scanning angle, as compared with a case where the beam portions 14a and 14b are not present (see Patent Document 1). Thus, the light-scanning device according to the first embodiment may be designed to have a high resonance frequency while holding a scanning angle by designing stresses applied to the beam portions 14a and 14b to be smaller than those applied to the beam portions 12a to 12d. For example, the stresses applied to the beam portions 14a and 14b may be decreased by designing the beam portions 14a and 14b having a thickness smaller than those of the beam portions 12a to 12d or having a length longer than those of the beam portions 12a to 12d.

In the light-scanning device according to the first embodiment, the other ends of the beam portions 14a and 14b are connected to the arm portions 15a and 15b, respectively, and thus the arm portions 15a and 15b are also deformed when the mirror unit 11 vibrates. Accordingly, in the light-scanning device according to the first embodiment, stress applied to the beam portions 14a and 14b are dispersed, and thus the beam portions 14a and 14b are more difficult to be destroyed.

In the light-scanning device according to the first embodiment, the other ends of the beam portions 14a and 14b are connected to the arm portions 15a and 15b, respectively, and thus shaking during the vibration of the mirror unit 11 may be reduced.

First Modified Example

Figure 2:
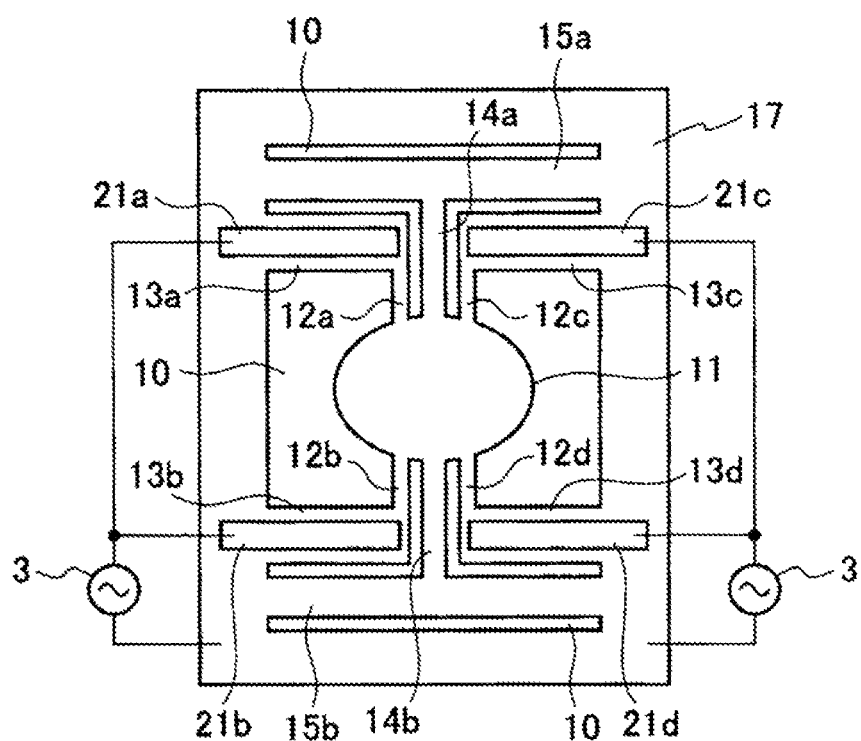
FIG. 2 is a schematic plan view illustrating a light-scanning device according to a first modified example of the first embodiment.

A light-scanning device according to a first modified example of the first embodiment further includes piezoelectric devices 21a to 21d that are respectively provided from top surfaces of the arm portions 13a to 13d to a top surface of the frame portion 17, as illustrated in FIG. 2 and drive the arm portions 13a to 13d by being displaced.

The piezoelectric devices 21a to 21d are configured by sequentially stacking a lower electrode layer, a piezoelectric body layer, an upper electrode layer, and the like. The piezoelectric body layer is constituted by a piezoelectric body having a high piezoelectric property, for example, lead zirconate titanate (PZT)-based or lanthanum nickel oxide ($LaNiO_3$). In addition, the piezoelectric body layer may be formed of crystal, lithium niobate ($LiNbO_3$), lithium tantalate ($LiTaO_3$), bismuth germanium oxide ($Bi_{12}GeO_{20}$), langasite ($La_3Ga_5SiO_{14}$), or the like.

An adhesion layer may be formed between the upper electrode layer and the piezoelectric body layer, wherein the adhesion layer adheres to a top surface of the piezoelectric body layer, has a thickness of, for example, about 0.02 μm, and is formed of titanium (Ti) or the like. The adhesion layer also serves as a part of the upper electrode layer. The upper electrode layer has a thickness of, for example, 0.3 μm and is formed of, for example, platinum (Pt), iridium (Ir), gold (Au), silver (Ag), copper (Cu), or aluminum (Al).

The lower electrode layer has a thickness of, for example, 0.1 μm. An electrode material is formed on the lower electrode layer. The electrode material is formed of platinum (Pt) and also serves as an orientation layer which is primarily oriented so as to be displaced in a direction (vertical direction) perpendicular to the arm portions 13a to 13d. For example, titanium (Ti) having a thickness of 0.02 μm may be formed between the lower electrode layer and a substrate in order to improve adhesion therebetween.

The upper electrode layers of the piezoelectric device 21a and the piezoelectric device 21b, and the lower electrode layers of the piezoelectric device 21a and the piezoelectric device 21b are electrically connected to each other. The upper electrode layers of the piezoelectric device 21c and the piezoelectric device 21d, and the lower electrode layers of the piezoelectric device 21c and the piezoelectric device 21d are electrically connected to each other. An insulating layer, which is formed of $SiO_2$ or the like, is formed on surfaces of the arm portions 13a to 13d and the frame portion 17 so as to be insulated from the piezoelectric devices 21a to 21d.

Sinusoidal voltages, which are applied to the piezoelectric devices 21a and 21b and the piezoelectric devices 21c and 21d from a signal source 3, have opposite phases to each other and serve as driving signals, and thus the piezoelectric devices 21a and 21b and the piezoelectric devices 21c and 21d serve as driving units that alternately generate warpage in the arm portions 13a and 13b and the arm portions 13c and 13d. The mirror unit 11 is vibrated via the arm portions 13a to 13d by driving the piezoelectric devices 21a to 21d with a resonance frequency of the mirror unit 11 in tilting mode.

In the electromagnetic driving method, a greater amount of current is required to be flowed in order to improve a driving force. Thus, power consumption is likely to increase, and a resonance frequency of a mirror structure may be fluctuated due to an increase in Joule heat. In the piezoelectric driving method, even though a large voltage is applied, driving with a stable resonance frequency is possible since a current to be flowed is extremely small, power consumption may be reduced, and the temperature is increased a little. In addition, in order to make it difficult to cause an insulation breakdown, a piezoelectric film may have a large thickness, and thus it is easier to improve a driving force.

In the light-scanning device according to the first modified example of the first embodiment, the light-scanning device further includes the piezoelectric devices 21a to 21d, and thus it is easy to apply a sufficient driving force with respect to a spring constant increased by a plurality of pairs of beam portions. In addition, the piezoelectric devices 21a to 21d may be formed using an MEMS technique, and thus an increase in a manufacturing cost of the light-scanning device may be suppressed.

Second Modified Example

Figure 3:
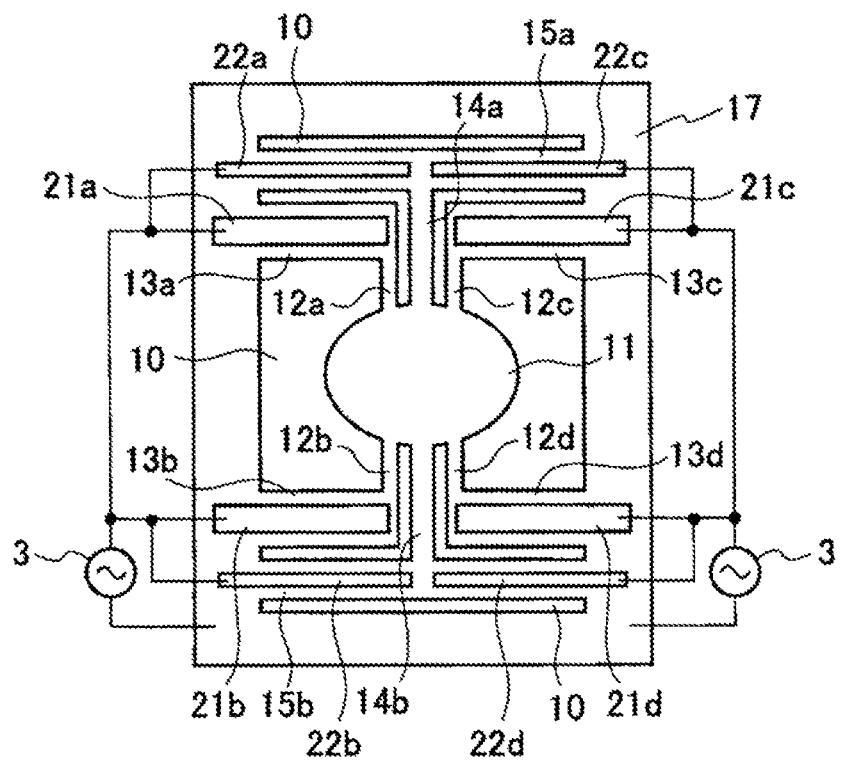
FIG. 3 is a schematic plan view illustrating a light-scanning device according to a second modified example of the first embodiment.

A light-scanning device according to a second modified example of the first embodiment further includes piezoelectric devices 22a to 22d on top surfaces of the arm portions 15a and 15b, as illustrated in FIG. 3. The piezoelectric devices 22a to 22d are configured by sequentially stacking a lower electrode layer, a piezoelectric body layer, an upper electrode layer, and the like, in the same manner as the piezoelectric devices 21a to 21d.

The piezoelectric devices 22a and 22b are formed from the top surfaces of one ends of the center portions of the arm portions 15a and 15b to the top surface of the frame portion 17, respectively. The piezoelectric devices 22c and 22d are formed from the top surfaces of the other ends of the center portions of the arm portions 15a and 15b to the top surface of the frame portion 17, respectively.

Upper electrode layers and lower electrode layers of the piezoelectric devices 22a and 22b are electrically connected to upper electrode layers and lower electrode layers of the piezoelectric devices 21a and 21b, respectively. Upper electrode layers and lower electrode layers of the piezoelectric devices 22c and 22d are electrically connected to upper electrode layers and lower electrode layers of the piezoelectric devices 21c and 21d, respectively. An insulating layer, which is formed of $SiO_2$ or the like, is formed on surfaces of the arm portions 13a to 13d, 15a, and 15b and the frame portion 17 so as to be insulated from the piezoelectric devices 21a to 21d and 22a to 22d.

Sinusoidal voltages which are applied to the piezoelectric devices 21a, 21b, 22a and 22b and the piezoelectric devices 21c, 21d, 22c and 22d from a signal source 3 have opposite phases to each other, and thus the piezoelectric devices 21a, 21b, 22a, and 22b and the piezoelectric devices 21c, 21d, 22c, and 22d serve as driving units that alternately generate warpage in the arm portions 13a and 13b and each of the one ends of the arm portions 15a and 15b, and the arm portions 13c and 13d and each of other ends of the arm portions 15a and 15b. The mirror unit 11 is vibrated via the arm portions 13a to 13d, 15a, and 15b by driving the piezoelectric devices 21a to 21d and 22a to 22d with a resonance frequency of the mirror unit 11 in tilting mode.

In the light-scanning device according to the second modified example of the first embodiment, the light-scanning device further includes the piezoelectric devices 22a to 22d, and thus a more sufficient driving force may be applied with respect to a spring constant increased by a plurality of pairs of beam portions.

Third Modified Example

Figure 4:
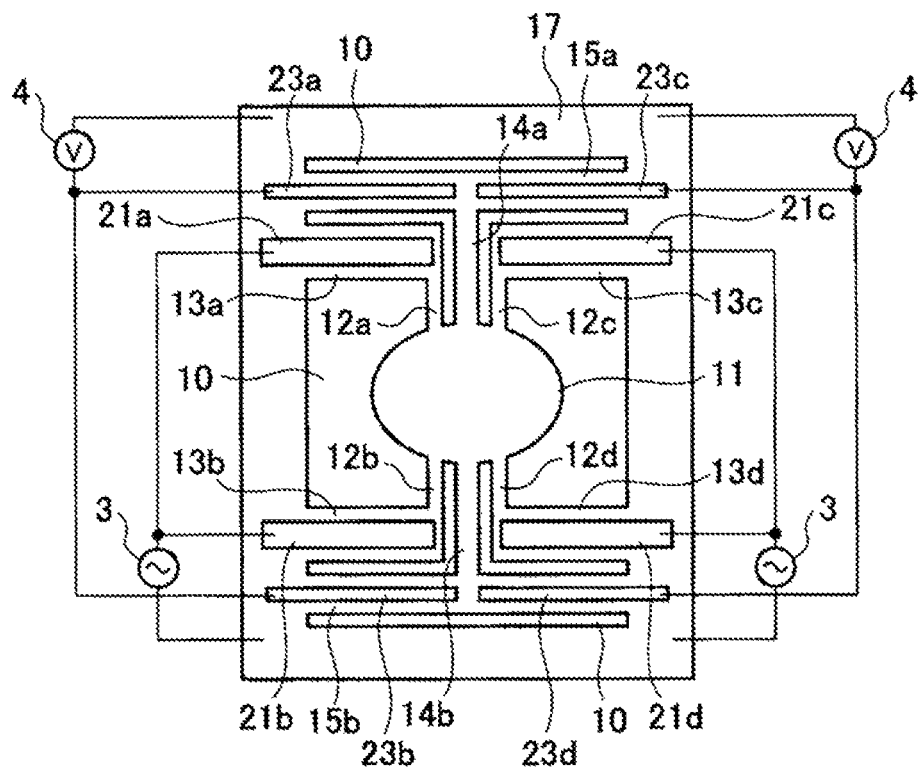
FIG. 4 is a schematic plan view illustrating a light-scanning device according to a third modified example of the first embodiment.

A light-scanning device according to a third modified example of the first embodiment includes piezoelectric devices 23a to 23d having the same configurations as the piezoelectric devices 22a to 22d, as illustrated in FIG. 4. However, the light-scanning device according to the third modified example of the first embodiment is different from the light-scanning device according to the second modified example of the first embodiment in that the piezoelectric devices 23a to 23d serve as detecting units that detect displacement of the arm portions 15a and 15b.

An upper electrode layer and a lower electrode layer of the piezoelectric device 23a are electrically connected to an upper electrode layer and a lower electrode layer of the piezoelectric device 23b, respectively. An upper electrode layer and a lower electrode layer of the piezoelectric device 23c are electrically connected to an upper electrode layer and a lower electrode of the piezoelectric device 23d, respectively.

The arm portions 15a and 15b are displaced in a vertical direction by transmitting the vibration of the mirror unit 11 by the driving of the arm portions 13a and 13b via the beam portions 14a and 14b. The piezoelectric devices 23a and 23b and the piezoelectric devices 23c and 23d alternately generate a voltage between the upper electrode layer and a lower electrode layer in accordance with the displacement of the arm portions 15a and 15b. The voltages generated by the piezoelectric devices 23a and 23b and the piezoelectric devices 23c and 23d are detected by a detector 4, and thus the signal source 3 may feedback-control a driving signal to be applied to the piezoelectric devices 21a to 21d.

In the light-scanning device according to the third modified example of the first embodiment, even though a resonance frequency is fluctuated due to a heat environment or the like, a frequency of the vibration of the mirror unit 11 may be detected by the piezoelectric devices 23a to 23d. Thus, the mirror unit 11 may be always vibrated with a resonance frequency by feedback control.

In the light-scanning device according to the third modified example of the first embodiment, for example, the beam portions 14a and 14b are formed to have a thickness smaller than those of the beam portions 12a to 12d, and thus the arm portions 15a and 15d and the piezoelectric devices 23a to 23d are likely to be displaced, thereby facilitating the detection of the voltages that are generated in the piezoelectric devices 23a to 23d.

Second Embodiment

Figure 5:
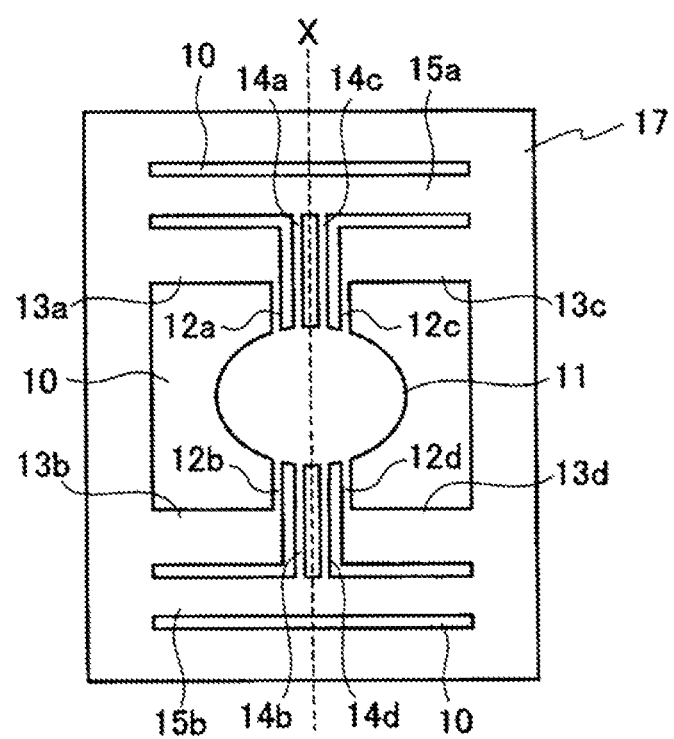
FIG. 5 is a schematic plan view illustrating a light-scanning device according to a second embodiment.

A light-scanning device according to a second embodiment of the present invention is different from the light-scanning device according to the first embodiment in that the light-scanning device according to the second embodiment includes a plurality of beam portions 14a and 14c and a plurality of beam portions 14b and 14d between the beam portions 12a and 12b and the beam portions 12c and 12d at both ends of the mirror unit 11, as illustrated in FIG. 5. Other configurations that are not described in the second embodiment are substantially the same as those in the first embodiment, and thus their repeated description will be omitted.

The beam portions 14a and 14b (third beam portions) have, for example, a bar shape, and extend in a direction parallel to the rotation axis X. The beam portions 14a and 14b support the both ends of the mirror unit 11 by respectively connecting the both ends of the mirror unit 11 to one ends of the beam portions 14a and 14b so that straight line connected to each other are separated from and are parallel to the rotation axis X between the beam portions 12a and 12b and the beam portions 12c and 12d.

The beam portions 14c and 14d (fourth beam portions) have, for example, a bar shape, and extend in a direction parallel to the rotation axis X. The beam portions 14c and 14d support the both ends of the mirror unit 11 by respectively connecting the both ends of the mirror unit 11 to one ends of the beam portions 14c and 14d between the beam portions 12a and 12b and the beam portions 12c and 12d so that the beam portions 14c and 14d are line-symmetrical to the beam portions 14a and 14b about the rotation axis X as an axis of symmetry.

The arm portions 15a and 15b (third arm portions) have, for example, a band shape, and extend in a direction perpendicular to the beam portions 14a and 14b. The arm portions 15a and 15b support the other ends of the beam portions 14a and 14c and the beam portions 14b and 14d by respectively connecting the other ends of the beam portions 14a and 14c and the beam portions 14b and 14d to the center portions of the arm portions 15a and 15b.

The frame portion 17 supports the other ends of the arm portions 13a to 13d by respectively connecting the other ends of the arm portions 13a to 13d to the frame portion 17. The frame portion 17 supports both ends of the arm portions 15a and 15b by respectively connecting both ends of the arm portions 15a and 15b to the frame portion 17.

The light-scanning device according to the second embodiment has a schematic rectangular flat plate shape. The light-scanning device has topology of two rotational symmetry that uses a perpendicular line with respect to the mirror unit 11 which passes through the center of the mirror unit 11, as a point of symmetry.

In the light-scanning device according to the second embodiment, when the mirror unit 11 is vibrated so as to have the same scanning angle with the same resonance frequency design, stress applied to each beam portion is low, and thus the beam portion is difficult to be destroyed (or fractured), as compared with a configuration in which the mirror unit 11 is supported by a pair of beam portions.

In the light-scanning device according to the second embodiment, the light-scanning device further includes the beam portions 14c and 14d between the beam portions 12a and 12b and the beam portions 12c and 12d, and thus stress applied to each beam portion may further be dispersed, thereby reducing the stress. Thus, in the light-scanning device according to the second embodiment, spring constants of the beam portions 12a to 12d and 14a to 14d may be designed to be larger, and a high resonance frequency and a large scanning angle may be designed.

The light-scanning device according to the second embodiment is designed to have a size so that stress applied to the beam portions 14a to 14d are smaller than stress applied to the beam portions 12a to 12d, and thus a high resonance frequency may be designed, and a scanning angle may be held. For example, the stress applied to the beam portions 14a to 14d may be decreased by designing the beam portions 14a to 14d having a thickness smaller than those of the beam portions 12a to 12d or having a length longer than those of the beam portions 12a to 12d. In the light-scanning device according to the second embodiment, the arm portions 15a and 15b are likely to be displaced, for example, by designing the beam portions 14a to 14d having a thickness smaller than those of the beam portions 12a to 12d. Accordingly, when the piezoelectric devices 23a to 23d are formed as detecting units in the arm portions 15a and 15b, the piezoelectric devices 23a to 23d are likely to be displaced, thereby facilitating the detection of the voltages that are generated in the piezoelectric devices 23a to 23d.

In addition, in the light-scanning device according to the second embodiment, the other ends of the beam portions 14a to 14d are connected to the arm portions 15a and 15b, and thus shaking during the vibration of the mirror unit 11 may be reduced.

Third Embodiment

Figure 6:
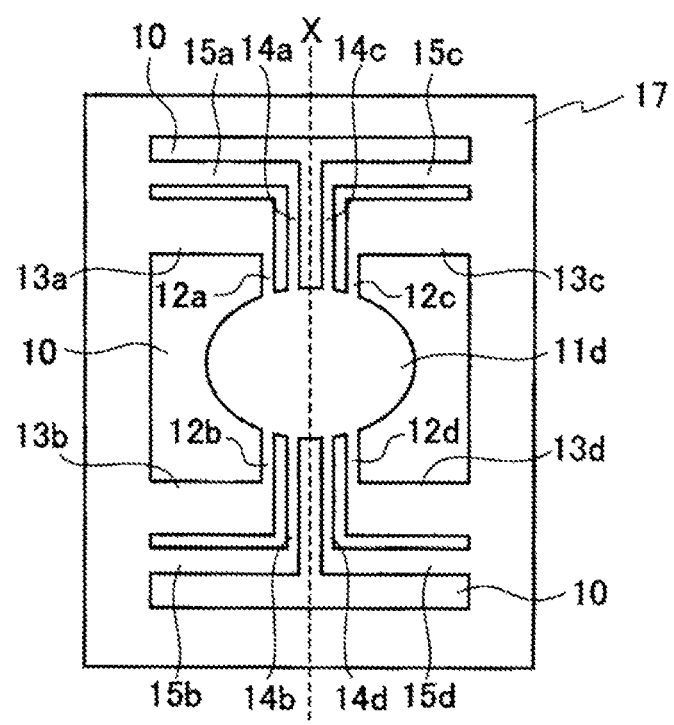
FIG. 6 is a schematic plan view illustrating a light-scanning device according to a third embodiment.

A light-scanning device according to a third embodiment of the present invention is different from the light-scanning device according to the second embodiment in that the light-scanning device according to third embodiment includes arm portions 15a to 15d that respectively support the beam portions 14a to 14d, as illustrated in FIG. 6. Other configurations that are not described in the third embodiment are substantially the same as those in the first and second embodiments, and thus their repeated description will be omitted.

The beam portions 14a and 14b (third beam portions) have, for example, a bar shape, and extend in a direction parallel to the rotation axis X. The beam portions 14a and 14b support the both ends of the mirror unit 11 by respectively connecting the both ends of the mirror unit 11 to one ends of the beam portions 14a and 14b so that straight line connected to each other are separated from and are parallel to the rotation axis X between the beam portions 12a and 12b and the beam portions 12c and 12d.

The beam portions 14c and 14d (fourth beam portions) have, for example, a bar shape, and extend in a direction parallel to the rotation axis X. The beam portions 14c and 14d support the both ends of the mirror unit 11 by respectively connecting the both ends of the mirror unit 11 to one ends of the beam portions between the beam portions 12a and 12b and the beam portions 12c and 12d so that the beam portions 14c and 14d are line-symmetrical to the beam portions 14a and 14b about the rotation axis X as an axis of symmetry.

The arm portions 15a to 15d have, for example, a band shape, and extend in a direction perpendicular to the beam portions 14a to 14d. The arm portions 15a and 15b (third arm portions) support the other ends of the beam portions 14a and 14b by respectively connecting the other ends of the beam portions 14a and 14b to the one ends of the arm portions 15a and 15b. The arm portions 15c and 15d (fourth arm portions) support the other ends of the beam portions 14c and 14d by respectively connecting the other ends of the beam portions 14c and 14d to the one ends of the arm portions 15c and 15d so that the arm portions 15c and 15d are line-symmetrical to the arm portions 15a and 15b about the rotation axis X as an axis of symmetry.

The frame portion 17 supports the other ends of the arm portions 13a to 13d and the arm portions 15a and 15b by connecting them.

The light-scanning device according to the third embodiment has a schematic rectangular flat plate shape. The light-scanning device has topology of two rotational symmetry that uses a perpendicular line with respect to the mirror unit 11 which passes through the center of the mirror unit 11, as a point of symmetry.

In the light-scanning device according to the third embodiment, when the mirror unit 11 is vibrated so as to have the same scanning angle with the same resonance frequency design, stress applied to each beam portion is low, and thus the beam portion is difficult to be destroyed (or fractured), as compared with a configuration in which the mirror unit 11 is supported by a pair of beam portions.

In the light-scanning device according to the third embodiment, the light-scanning device further includes the beam portions 14c and 14d between the beam portions 12a and 12b and the beam portions 12c and 12d, and thus stress applied to each beam portion may further be dispersed, thereby reducing the stress. Thus, in the light-scanning device according to the third embodiment, spring constants of the beam portions 12a to 12d and 14a to 14d may be designed to be larger, and a high resonance frequency and a large scanning angle may be designed.

The light-scanning device according to the third embodiment includes the arm portions 15a to 15d that respectively support the beam portions 14a to 14d. Accordingly, stress applied to the beam portions 14a to 14d is further dispersed, and thus the beam portions 14a and 14b are more difficult to be destroyed.

In addition, in the light-scanning device according to the third embodiment, the other ends of the beam portions 14a to 14d are connected to the arm portions 15a to 15d, and thus shaking during the vibration of the mirror unit 11 may be reduced further comparing with the second embodiment.

First Modified Example

Figure 7:
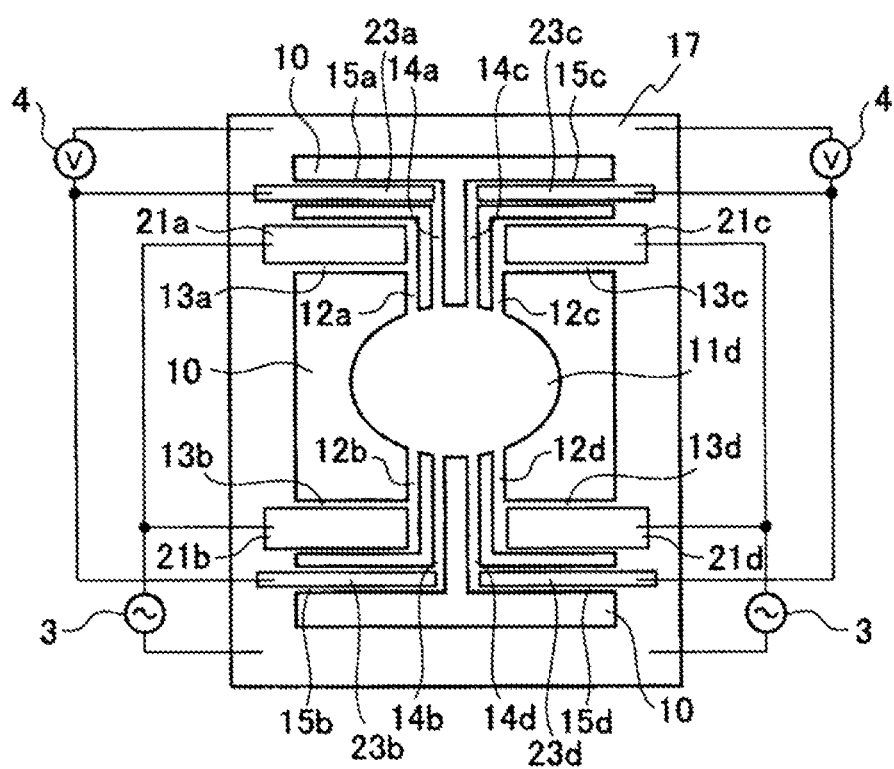
FIG. 7 is a schematic plan view illustrating a light-scanning device according to a first modified example of the third embodiment.

A light-scanning device according to a first modified example of the third embodiment further includes the piezoelectric devices 21a to 21d that drive the arm portions 13a to 13d and the piezoelectric devices 23a to 23d that detect the displacement of the arm portions 15a to 15d, as illustrated in FIG. 7. The piezoelectric devices 23a to 23d are formed from the top surfaces of the arm portions 15a to 15d to the top surface of the frame portion 17.

The arm portions 15a to 15d are displaced in a vertical direction by transmitting the vibration of the mirror unit 11 caused by the driving of the arm portions 13a and 13b to the arm portions 15a to 15d via the beam portions 14a to 14d. The piezoelectric devices 23a and 23b and the piezoelectric devices 23c and 23d alternately generate a voltage between the upper electrode layer and a lower electrode layer in accordance with the displacement of the arm portions 15a and 15b and the arm portions 15c and 15d. The voltages generated by the piezoelectric devices 23a and 23b and the piezoelectric devices 23c and 23d are detected by the detector 4, and thus the signal source 3 may feedback-control a driving signal to be applied to the piezoelectric devices 21a to 21d.

In the light-scanning device according to the first modified example of the third embodiment, the arm portions 15a to 15d respectively support the beam portions 14a to 14d, and thus the arm portions 15a to 15d and the piezoelectric devices 23a to 23d are likely to be displaced, thereby facilitating the detection of the voltages that are generated in the piezoelectric devices 23a to 23d. In this case, for example, the beam portions 14a to 14d are formed to have a thickness smaller than those of the beam portions 12a to 12d, and thus the piezoelectric devices 23a to 23d are more likely to be displaced, thereby facilitating the detection of the voltages that are generated in the piezoelectric devices 23a to 23d.

In addition, in the light-scanning device according to the first modified example of the third embodiment, even though a resonance frequency is fluctuated due to a heat environment or the like, a vibration state of the mirror unit 11 may be detected using the piezoelectric devices 23a to 23d. Thus, the mirror unit 11 may be always vibrated with a resonance frequency by feedback control.

Second Modified Example

Figure 8:
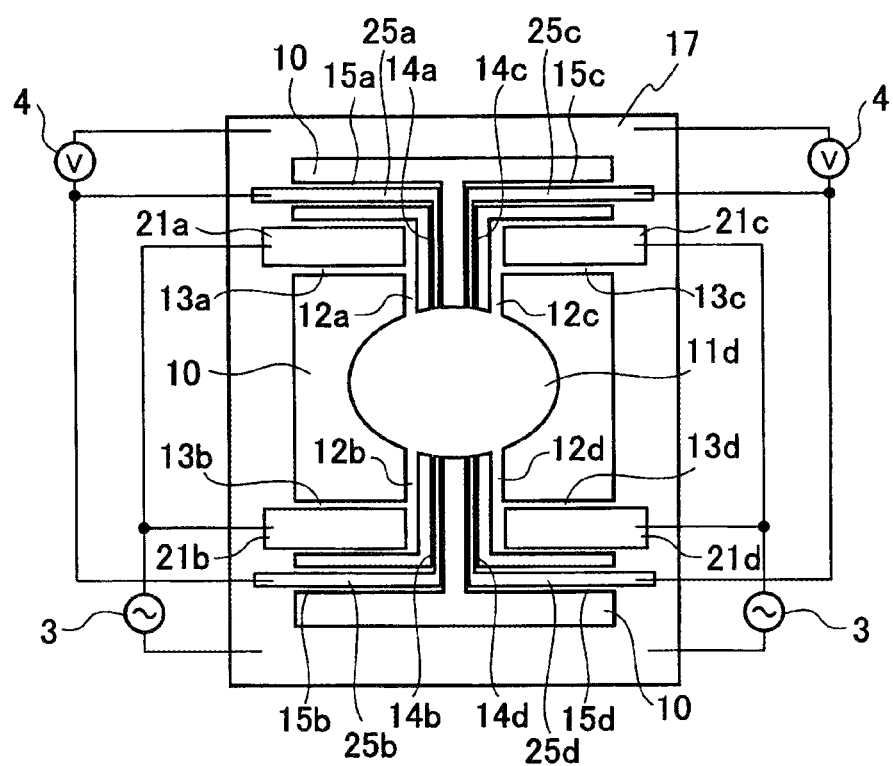
FIG. 8 is a schematic plan view illustrating a light-scanning device according to a second modified example of the third embodiment.

A light-scanning device according to a second modified example of the third embodiment is different from the light-scanning device according to the first modified example of the third embodiment in that piezoelectric devices 25a to 25d for detecting a frequency of the vibration of the mirror unit 11 are formed on the top surfaces of the arm portions 15a to 15d and the beam portions 14a to 14d, as illustrated in FIG. 8. The piezoelectric devices 25a to 25d are formed from the top surfaces of the beam portions 14a to 14d to the top surface of the frame portion 17 via the top surfaces of the arm portions 15a to 15d.

In the light-scanning device according to the second modified example of the third embodiment, the piezoelectric devices 25a to 25d are also formed on the top surfaces of the beam portions 14a to 14d having an amount of displacement which is larger than those of the arm portions 15a to 15d, thereby facilitating the detection of the voltages that are generated in the piezoelectric devices 25a to 25d. In addition, there is a concern that the piezoelectric devices 25a to 25d may be peeled when the amount of displacement is large. However, the beam portions 14a to 14d are located further inside than the beam portions 12a to 12d and have a small amount of displacement, and thus destruction such as peeling may be reduced.

Fourth Embodiment

Figure 9:
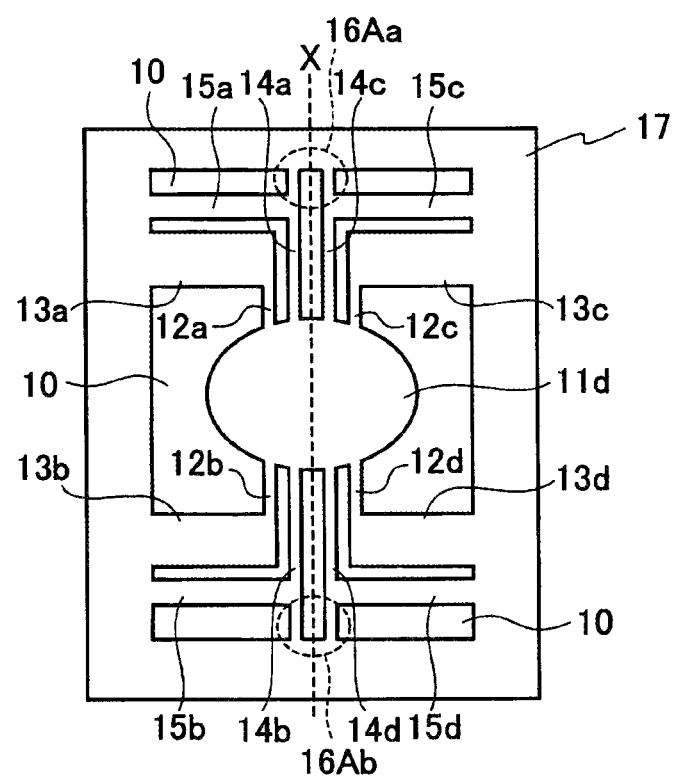
FIG. 9 is a schematic plan view illustrating a light-scanning device according to a fourth embodiment.

A light-scanning device according to a fourth embodiment of the present invention is different from the light-scanning devices according to the first to third embodiments in that termination portions of the beam portions 14a to 14d extending from the mirror unit 11 constitute shaking suppressing portions 16Aa and 16Ab for reducing the shaking of the mirror unit 11, as illustrated in FIG. 9. Other configurations that are not described in the fourth embodiment are substantially the same as those in the first to third embodiments, and thus their repeated description will be omitted.

The shaking suppressing portions 16Aa and 16Ab are termination portions of the beam portions 14a and 14c and the beam portions 14b and 14d that extend farther than the arm portions 15a to 15d from the mirror unit 11, and are supported by being connected to the frame portion 17. The shaking suppressing portions 16Aa and 16Ab reduce shaking of the mirror unit 11 in a vertical direction when the mirror unit 11 vibrates with a resonance frequency.

In the light-scanning device according to the fourth embodiment, when the mirror unit 11 is vibrated so as to have the same scanning angle with the same resonance frequency design, stress applied to each beam portion is low, and thus a beam portion is difficult to be destroyed (or fractured), as compared with a configuration in which the mirror unit 11 is supported by a pair of beam portions.

In addition, in the light-scanning device according to the fourth embodiment, the light-scanning device further includes the beam portions 14c and 14d between the beam portions 12a and 12b and the beam portions 12c and 12d, and thus stress applied to each beam portion may further be dispersed, thereby reducing the stress. Thus, in the light-scanning device according to the fourth embodiment, spring constants of the beam portions 12a to 12d and 14a to 14d may be designed to be larger without increasing the torsional stress. The light-scanning device according to the fourth embodiment may be designed to have a high resonance frequency and a large scanning angle.

In addition, the light-scanning device according to the fourth embodiment includes the arm portions 15a to 15d that respectively support the beam portions 14a to 14d, and thus stress applied to the beam portions 14a to 14d is further be dispersed, and thus the beam portions 14a and 14b are more difficult to be destroyed.

In addition, in the light-scanning device according to the fourth embodiment, the beam portions 14a to 14d are connected to the arm portions 15a to 15d, and thus shaking during the vibration of the mirror unit 11 may be reduced. In addition, the light-scanning device according to the fourth embodiment includes the shaking suppressing portions 16Aa and 16Ab, and thus shaking during the vibration of the mirror unit 11 may further be reduced.

First Modified Example

Figure 10:
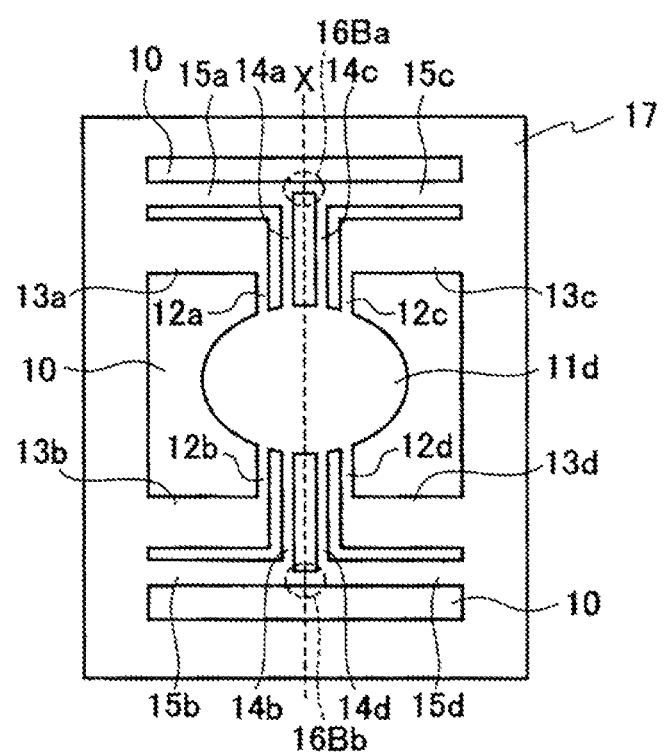
FIG. 10 is a schematic plan view illustrating a light-scanning device according to a first modified example of the fourth embodiment.

When a shaking suppressing portions 16Ba and 16Bb, which are connection portions connecting between the arm portions 15a and 15c and connecting between the arm portions 15b and 15d, as illustrated in FIG. 10, is used instead of shaking suppressing portions 16Aa and 16Ab connected to the frame portion 17, the same effect may be obtained. The shaking suppressing portions 16Ba and 16Bb included in the light-scanning device according to the first modified example of the fourth embodiment are remaining portions which remain after the portion between the arm portions 15a and 15c and the portion between the arm portions 15b and 15d are cut out from the facing sides of the beam portions 14a and 14c and the beam portions 14b and 14d, when forming the light-scanning device.

In the light-scanning device according to the first modified example of the fourth embodiment, the shaking suppressing portions 16Ba and 16Bb are formed to have a width narrower than widths of the arm portions 15a to 15d, and thus stress applied to the beam portions 14a to 14d may further be reduced, thereby further reducing shaking during the vibration of the mirror unit 11.

Figure 11:
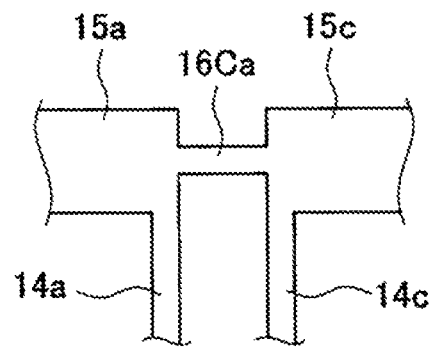
FIG. 11 is a schematic plan view illustrating the light-scanning device according to the first modified example of the fourth embodiment.

In addition, the shaking suppressing portions 16Ba and 16Bb may be replaced by shaking suppressing portions 16Ca and 16Cb (FIG. 11 illustrates only the shaking suppressing portion 16Ca), which are remaining portions which remain after the portion between the arm portions 15a and 15c and the portion between the arm portions 15b and 15d are cut out from both of the facing sides, as illustrated in FIG. 11, in the forming of the light-scanning device.

Second Modified Example

Figure 12:
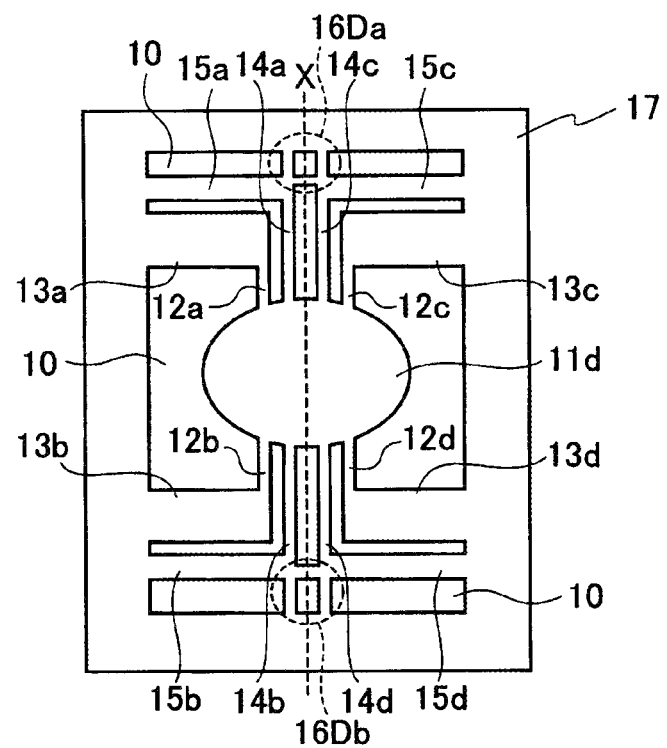
FIG. 12 is a schematic plan view illustrating a light-scanning device according to a second modified example of the fourth embodiment.

In addition, the shaking suppressing portions 16Aa and 16Ab may be replaced by shaking suppressing portions 16Da and 16Db that further include the shaking suppressing portions 16Ba and 16Bb, as illustrated in FIG. 12. The shaking suppressing portions 16Da and 16Db, which are included in the light-scanning device according to the second modified example of the fourth embodiment, are constituted by the termination portions of the beam portions 14a and 14c and the beam portions 14b and 14d which are supported by being connected to the frame portion 17, and the connection portions that connect the arm portions 15a and 15c and connect the arm portions 15b and 15d.

In the light-scanning device according to the second modified example of the fourth embodiment, the shaking suppressing portions 16Da and 16Db connect between the arm portions 15a and 15c and between the arm portions 15b and 15d, and are connected to the frame portion 17, and thus shaking during the vibration of the mirror unit 11 may further be reduced.

Third Modified Example

Figure 13:
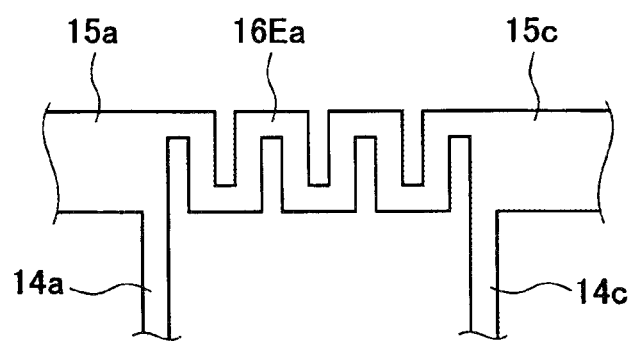
FIG. 13 is a schematic plan view illustrating a light-scanning device according to a third modified example of the fourth embodiment.
Figure 14:
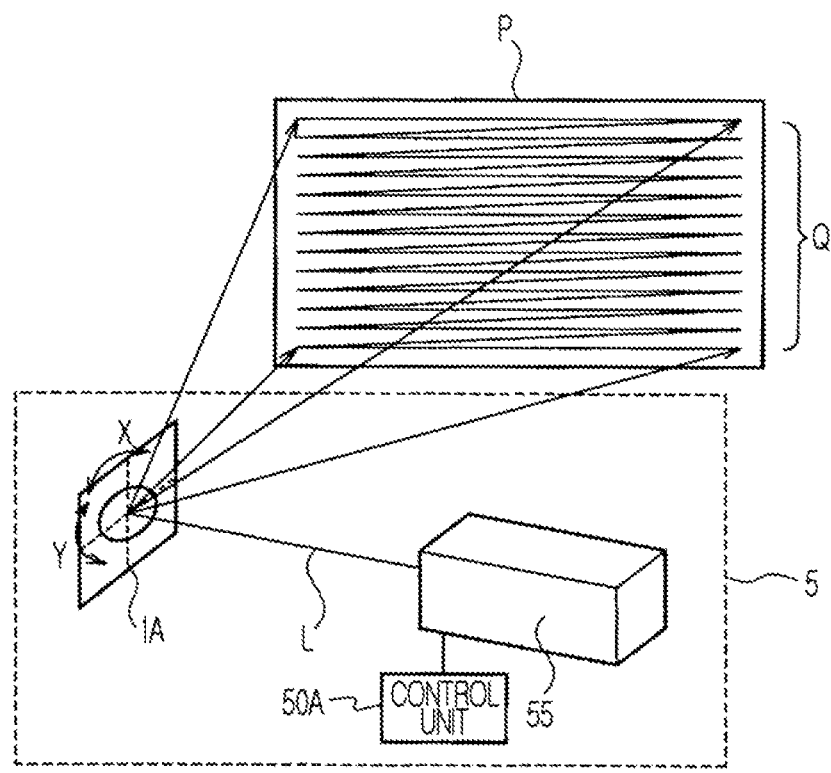
FIG. 14 is a schematic view illustrating a display apparatus according to a fifth embodiment.

In addition, as illustrated in FIG. 13, the shaking suppressing portions 16Ba and 16Bb may be replaced by shaking suppressing portions 16Ea and 16Eb (FIG. 13 illustrates only the shaking suppressing portion 16Ea) which have plane patterns and are bent alternately in U shape, like the shaking suppressing portions 16Ba and 16Bb snake between the arm portions 15a and 15c and between the arm portions 15b and 15d.

In the light-scanning device according to the third modified example of the fourth embodiment, the light-scanning device includes the shaking suppressing portions 16Ea and 16Eb that are bent alternately with each other, and thus stress applied to the beam portions 14a to 14d is further reduced, thereby further reducing shaking during the vibration of the mirror unit 11.

Fifth Embodiment

As a fifth embodiment of the present invention, a display apparatus 5 using a light-scanning device according to the first to fourth embodiments will be described below. The display apparatus 5 is, for example, a laser projector, a head mount display, or a head-up display. The display apparatus 5 according to the fifth embodiment includes a biaxial light-scanning device 1A, a light source unit 55, and a control unit 50A that controls the driving of the biaxial light-scanning device 1A and the light source unit 55. The light source unit 55 emits a laser beam L of which brightness is modulated in accordance with image information of an image Q by the control of the control unit 50A. The biaxial light-scanning device 1A reflects the laser beam L and scans a screen P, and thus the display apparatus 5 displays the image Q on the screen P.

Figure 15:
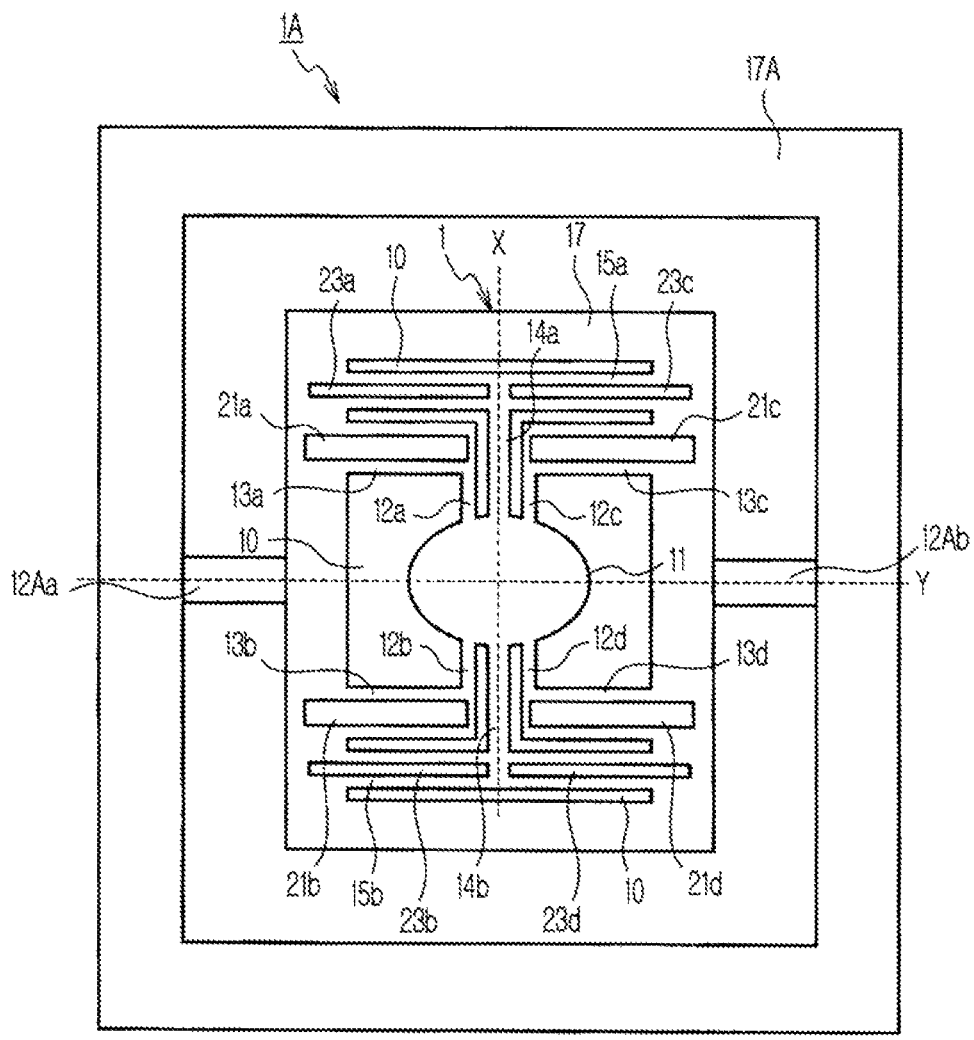
FIG. 15 is a schematic view illustrating a biaxial light-scanning device included in the display apparatus according to the fifth embodiment.

The biaxial light-scanning device 1A includes a light-scanning device 1, which is one of the light-scanning devices according to the first to fourth embodiments, as illustrated in FIG. 15. In the example illustrated in FIG. 15, the light-scanning device according to third modified example of the first embodiment is used as the light-scanning device 1. The light-scanning device 1 performs scanning in a horizontal direction by the vibration of the mirror unit 11 with respect to the rotation axis X.

The biaxial light-scanning device 1A includes a pair of beam portions 12Aa and 12Ab that support the light-scanning device 1 so that the light-scanning device 1 may vibrate with respect to a rotation axis Y perpendicular to the rotation axis X, and a frame portion 17A that supports the beam portions 12Aa and 12Ab. The frame portion 17A has a window portion penetrating from the top surface to the bottom thereof, and the light-scanning device 1 is disposed in the window portion of the frame portion 17A.

The biaxial light-scanning device 1A includes an actuator for vertical scanning, which is not shown in the drawing, so as to cause the light-scanning device 1 to be vibrated with respect to the rotation axis Y, and thus the mirror unit 11 performs scanning in a vertical direction. As a driving method with respect to the rotation axis Y, a piezoelectric driving method using a piezoelectric effect of a piezoelectric body, an electromagnetic driving method, such as a moving coil (MC) method or a moving magnet (MM) method using Lorentz force between a coil and a magnet, an electrostatic driving method using electrostatic force between electrodes, or the like may be employed.

The control unit 50A outputs a driving signal according to image information to the light source unit 55. The light source unit 55 includes light sources that may emit a red laser beam, a green laser beam, and a blue laser beam, respectively and the light sources emit modulated laser beams in accordance with the driving signal that is input from the control unit 50A. The light source unit 55 causes the laser beam emitted from each light source to be incident as the laser beam L on the mirror unit 11 of the light-scanning device 1 through optical devices such as a lens, a mirror, a dichroic mirror, and a dichroic prism, which are not illustrated in the drawing.

The control unit 50A outputs a driving signal to the actuator of the biaxial light-scanning device 1A with respect to the rotation axis Y and the piezoelectric devices 21a to 21d, which are actuators with respect to the rotation axis X, and drives the biaxial light-scanning device 1A so that the mirror unit 11 performs raster scanning in a biaxial direction.

The control unit 50A detects the voltages that are generated in the piezoelectric devices 23a to 23d, and feedback-controls the driving signal to be applied to the piezoelectric devices 21a to 21d so that the vibration of the biaxial light-scanning device 1A with respect to the rotation axis X becomes a resonance frequency. In the mirror unit 11 of the biaxial light-scanning device 1A, the laser beam L is reflected, and thus the screen P is scanned to thereby display the image Q on the screen P.

The display apparatus 5 according to the fifth embodiment may be designed to have a high resonance frequency and a large scanning angle, and may display a high-resolution and high-definition image by using the light-scanning device 1 in which the shaking of the mirror unit 11 is reduced.

In addition, according to the display apparatus 5 of the fifth embodiment, the reliability of the display apparatus 5 may be improved by using the light-scanning device 1 in which stress applied to the beam portion that supports the mirror unit 11 is dispersed and thus the beam portion is difficult to be destroyed.

Modified Example

Figure 16:
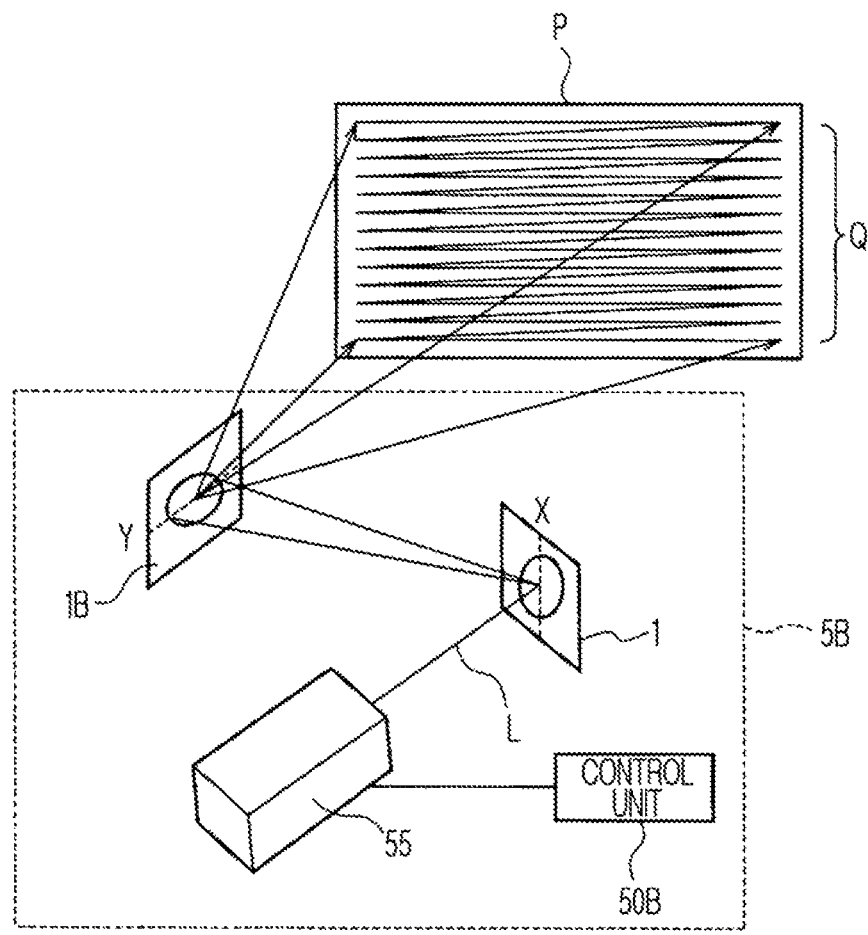
FIG. 16 is a schematic view illustrating a display apparatus according to a modified example of the fifth embodiment.

A display apparatus 5B according to a modified example of the fifth embodiment performs raster scanning in a biaxial direction by causing a light-scanning device 1B including a mirror unit, which is distinct from the light-scanning device 1, to perform scanning in a vertical direction, as illustrated in FIG. 16.

The light source unit 55 emits the laser beam L of which the brightness is modulated according to the image information of the image Q, to the mirror unit 11 of the light-scanning device 1, by the control of the control unit 50B. The light-scanning device 1 performs scanning in a horizontal direction by the vibration of the mirror unit 11 with respect to the rotation axis X. The light-scanning device 1B reflects the laser beam L, which is reflected by the mirror unit 11 of the light-scanning device 1, in the mirror unit and performs scanning in a vertical direction by the vibration of the mirror unit with respect to the rotation axis Y. The light-scanning device 1B reflects the laser beam L onto the screen P so as to perform raster scanning in a biaxial direction, thereby displaying the image Q on the screen P.

Other Embodiments

As described above, the embodiments of the present invention have been described. However, the present invention is not limited to the descriptions and the drawings given as part of disclosure. From the foregoing disclosure, it is obvious to those skilled in the art to understand various alternative modes, embodiments, and techniques.

In the above-described first to fourth embodiments, the light-scanning device may be used for the purpose of not vibrating the mirror unit 11 nor scanning an object. For example, the light-scanning device may be used as a pointer of a distance measurement apparatus using a laser beam. In addition, in the fifth embodiment, a projection type display apparatus using the light-scanning device 1 has been described, but the light-scanning device 1 may be applied to various scanners or sensors.

In addition, in the first to fourth embodiments, an example has been described in which the piezoelectric devices 23a to 23d and 25a to 25d are used as detecting units for detecting a vibration frequency of the mirror unit 11. However, the detecting units may be configured as a piezoresistive element that is embedded in the beam portions 14a to 14d, the arm portions 15a to 15d, or the like. The piezoresistive element may be formed by doping an Si layer, such as the beam portions 14a to 14d, the arm portions 15a to 15d, or the like with impurities.

According to the present invention, it is possible to provide a light-scanning device which may be designed to have a high resonance frequency and a large scanning angle, and a display apparatus.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A light-scanning device comprising:
   a mirror unit which vibrates using an arbitrary straight line as a rotation axis;
   a pair of first beam portions which are respectively disposed on a straight line that is parallel to the rotation axis, and support the mirror unit;
   a pair of second beam portions which are respectively disposed to be line-symmetrical to the pair of first beam portions about the rotation axis as an axis of symmetry, and support the mirror unit;
   a pair of first arm portions which respectively support the pair of first beam portions;
   a pair of second arm portions which respectively support the pair of second beam portions;
   a pair of third beam portions which support the mirror unit between the first beam portions and the second beam portions;
   a pair of third arm portions which respectively support the pair of third beam portions; and
   a frame portion which supports the first arm portions, the second arm portions, and the third arm portions.

2. The light-scanning device of claim 1, wherein each of the pair of third arm portions supports the third beam portion on the same straight line as the rotation axis.

3. The light-scanning device of claim 1, wherein the pair of third beam portions are disposed at a position other than the same straight line as the rotation axis, and
   wherein the light scanning device further comprises a pair of fourth beam portions that are disposed to be line-symmetrical to each of the pair of third beam portions using the rotation axis as an axis of symmetry and support both ends of the mirror unit.

4. The light-scanning device of claim 3, further comprising a pair of fourth arm portions that respectively support the pair of fourth beam portions at one ends thereof,
   wherein the pair of third arm portions respectively support the pair of third beam portions at one ends thereof, and
   the frame portion supports the other ends of the third arm portions and the other ends of the fourth arm portions.

5. The light-scanning device of claim 3, wherein when the mirror unit vibrates, the third beam portions and the fourth beam portions are formed so as to have stress smaller than those of the first beam portions and the second beam portions.

6. The light-scanning device of claim 1, wherein a piezoelectric device as a driving unit that vibrates the mirror unit is formed on a top surface of at least one of the first arm portions and the second arm portions.

7. The light-scanning device of claim 1, wherein a piezoelectric device as a detecting unit that detects vibration of the mirror unit is formed on top surfaces of the third arm portions.

8. The light-scanning device of claim 1, wherein a piezoresistive element as a detecting unit that detects vibration of the mirror unit is formed in at least one of the third arm portions and the third beam portions.

9. A display apparatus comprising:
   the light-scanning device according to claim 1;
   a light source unit which emits a laser beam to the mirror unit; and
   a control unit which controls driving of the light-scanning device and the light source unit.

\* \* \* \* \*